United States Patent [19]
Avci et al.

[11] Patent Number: 5,312,877
[45] Date of Patent: May 17, 1994

[54] HIGH SOLIDS COATING COMPOSITION

[75] Inventors: Selcuk Avci, Clifton, N.J.; Narendra M. Patel, Mount Pocono, Pa.; Leonard Di Leo, Clifton; Ralph H. Reiter, River Vale, both of N.J.

[73] Assignee: Sun Chemical Corporation, Fort Lee, N.J.

[21] Appl. No.: 16,633

[22] Filed: Feb. 12, 1993

[51] Int. Cl.$^5$ .............................................. C08F 20/00
[52] U.S. Cl. .................................. 525/444; 524/160; 524/167; 524/539; 525/400; 525/443; 525/519
[58] Field of Search ............... 524/539, 160, 167; 525/400, 443, 444, 519

[56] References Cited

U.S. PATENT DOCUMENTS

| | | | |
|---|---|---|---|
| 3,538,057 | 11/1970 | LaFoe | 260/75 |
| 3,592,796 | 7/1971 | Trapasso | 260/75 |
| 4,469,832 | 9/1984 | Singer et al. | 524/160 |
| 4,500,680 | 2/1985 | Singer | 525/143 |
| 4,500,689 | 2/1985 | Thomas | 525/442 |
| 5,068,273 | 11/1991 | Patel | 524/166 |

Primary Examiner—Paul R. Michl
Assistant Examiner—U. K. Rajguru
Attorney, Agent, or Firm—Jack Matalon

[57] ABSTRACT

A coating composition having a total solids content of at least about 85 wt. %, based on the weight of the composition, a volatile organic chemical content of less than about 15 wt. %, based on the weight of the composition and a Brookfield viscosity of about 500-2,000 centipoises at 25° C. The composition contains a polyester polyol having a weight average molecular weight of about 300-900 and a hydroxy number of about 150-400; at least one thermosettable polyester; an alkoxy aminoplast resin; a reactive diluent present in an amount of 0-30 wt. %, based on the weight of the composition; and an acid catalyst curing agent.

14 Claims, No Drawings

HIGH SOLIDS COATING COMPOSITION

FIELD OF THE INVENTION

The present invention relates to a unique coating composition which permits the coating of metal containers with a very thin film coat while concurrently maintaining an optimum opacity level and optimum film properties. The coating of the present invention comprises a high solids formulation having a relatively low viscosity and a very low level of volatile organic compound ("VOC") emission.

In particular, this invention relates to a coating composition having a total solids content of about 85 to 95 wt. %, based on the weight of the composition, a VOC content of less than about 15 wt. %, preferably less than 10 wt. %, based on the weight of the composition (as determined by EPA Test Method 24) and a Brookfield viscosity of about 500–2000, preferably 800 to 1,400, centipoises ("cps") at 25° C. The composition contains a polyester polyol, a thermosettable polyester, an aminoplast resin, a reactive diluent and an acid catalyst curing agent. The composition is especially useful for coating metal containers, e.g. beer cans, soda cans, etc. by various methods such as gravure coaters, roller coaters, spray coaters, dip coaters, etc.

BACKGROUND OF THE INVENTION

Typical solvent-based coating compositions contain 40–50 wt. % volatile organic solvents as the viscosity reducer, while typical water-based coating compositions contain 25–35 wt. % water and 10–20 wt. % volatile organic solvents as the viscosity reducers. The present coating compositions utilize reactive polyester polyols and reactive diluents as viscosity reducers. These viscosity reducers are substantially non-volatile at the coating composition cure temperatures conventionally employed during coating operations and may partially co-react with the remainder of the coating composition.

There is a need for a coating composition for the coating of metal substrates which possesses the requisite properties of rapid drying, high total solids content and low viscosity range while at the same time having a relatively low VOC content. Coating compositions having high VOC contents due to highly volatile oxygenated solvents such as glycol ethers, ketones, esters and the like are undesirable since they present safety and health hazards (fires, explosions and inhalation by workers of the large quantities of volatile solvents stored on the premises). Moreover, such solvents also present a serious environmental risk to air quality and coating plants must contain equipment for trapping and incinerating fugitive solvent emissions. Volatile solvents are also undesirable from a product point of view since they leave bubbles or cracks in the coating as they evaporate or they may be trapped between the outer surface of the base coating and the overprint varnish which is typically added after the substrate has been coated and printed.

Thermosetting compositions useful as a coating or ink and containing a thermosettable polyester, aminoplast resin, reactive diluent and alkali metal organosulfonate as a catalyst for curing the compositions are well known in the prior art, see U.S. Pat. No. 5,068,273 issued Nov. 26, 1991 to the present assignee. However, the compositions of the '273 patent do not meet the requisite properties of the present compositions.

SUMMARY OF THE INVENTION

The invention relates to a coating composition having a total solids content of at least about 85 wt. %, preferably 85–95 wt. %, based on the weight of the composition, a volatile organic chemical content of less than about 15 wt. %, preferably less than 10 wt. %, based on the weight of the composition, and a Brookfield viscosity of about 500–2,000 cps, preferably 800–1,400 cps, at 25° C., comprising:
(a) a polyester polyol having a weight average molecular weight of about 300–900 and a hydroxy number of about 150–400;
(b) at least one thermosettable polyester;
(c) an alkoxy aminoplast resin;
(d) a reactive diluent present in an amount of 0–30 wt. %, based on the weight of the composition; and
(e) an acid catalyst curing agent.

The preferred polyester polyols for use in the present invention are those which have a number average molecular weight about 300–900, preferably 300–600, and a hydroxy number of about 150–400, preferably 200–300. The polyols will typically fall within the following general formula:

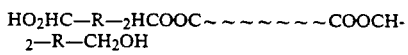

wherein R is a moiety derived from a $C_2$–$C_{12}$ saturated aliphatic or aromatic polyhydric alcohol. The polyester polyol is utilized in an amount of about 5–30 wt. %, preferably 10–25 wt. %, based on the weight of the coating composition.

The thermosettable polyesters consist of the polycondensation products of polycarboxylic acids with polyhydroxy alcohols and will typically have hydroxy values of about 40–250, preferably 150–250, as well as acid values of about 30–60, preferably 45–55. Typically, the polycarboxylic acids employed in preparing the polyesters will be aliphatic or aromatic acids such as phthalic, isophthalic, pyromellitic, terphthalic, adipic, etc. and many monocarboxylic acids (e.g. pelargonic, caproic, lauric, isostearic, benzoic, etc.) may be added to make the composition tougher and more flexible. The selected acids are condensed with polyhydroxy alcohols such as ethylene, propylene, diethylene, dipropylene or trimethylene glycols, pentaerythritol, glycerol, etc. as well as monoalcohols. The thermosettable polyester content will generally be in the range of about 15–40 wt %, preferably 20–30 wt. %, based on the weight of the coating composition.

The alkoxy aminoplast resin is a thermosetting resin which serves as a crosslinking agent for the polyester and the polyol. Such resins are typically prepared by reacting an aldehyde with an amine such as urea, ethylene urea, melamine, a guanamine, butylated glycouril, etc. A preferred alkoxy aminoplast resin is fully butylated glycoluril formaldehyde resin. The alkoxy aminoplast resins are utilized in amounts of about 5–30 wt. %, preferably 10–20 wt. %, based on the weight of the coating composition.

The coating compositions may include a reactive diluent which is non-volatile at the desired curing temperature (the coating compositions are typically cured at 160°–180° C.). The reactive diluent is utilized in an amount of about 0–30 wt. %, preferably 15–30 wt. %, based on the weight of the coating composition. Examples of suitable reactive diluents include $C_2$–$C_{12}$ glycols, glycol ethers, ethoxylated glycols and alcohols such as ethylene glycol, diethylene glycol, propylene glycol, dipropylene glycol, tripropylene glycol, butylene glycol, octylene glycol, ethylene glycol monobutyl ether, ethylene glycol monophenyl ether, diethylene glycol monohexyl ether, dipropylene glycol monomethyl ether, tripropylene glycol monomethyl ether, propylene glycol monophenyl ether, tridecyl alcohol, octyl alcohol, lauryl alcohol, octadecyl alcohol, butyl carbitol and the like. The preferred reactive diluent is ethoxylated neopentyl-glycol.

The acid catalyst curing agent is typically a $C_2-C_{12}$ organic acid such as p-toluenesulfonic acid, dinonylnaphthalene disulfonic acid, dodecyl benzenesulfonic acid, nonyl naphthalenesulfonic acid, and the like. The acid catalyst curing agent is utilized in an amount of about 0.5-3 wt. %, preferably 1-2 wt. %, based on the weight of the coating composition.

If a colored coating composition is desired, a pigment may be included in the composition in an amount of about 30-60 wt. %, preferably 35-45 wt. %, based on the weight of the coating composition. Typical pigments include C. I. White No. 4, C. I. White No. 6 (titanium dioxide), C. I. White No. 7 and the like. Other pigments known to be useful for coating metal substrates may be used if the rheological properties of such colored pigments are such that they possess satisfactory viscosities and provide acceptable laydown and adhesion to the metallic substrate. The preferred pigment is C. I. White No. 6.

If the coating composition is to be applied to a steel surface, the coating composition preferably includes an adhesion promoter in an amount of up to about 10 wt. %, preferably up to 5 wt. %, based on the weight of the coating composition. Examples of suitable adhesion promoters include acrylic and acrylated esters of phosphoric acid, organic titanates, zirconium propionate, zirconium acetylacetonate, zircoaluminates, alkyl phosphates, silanes, and the like.

If the coating composition is to be applied to an aluminum surface, improved laydown results are obtained by incorporating a wetting agent in an amount of up to about 2 wt. %, preferably up to 1 wt. %, based on the weight of the coating composition. Examples of suitable wetting agents include polyacrylates (which are preferred), polycarboxylic acid esters, fluorocarbons, modified silicone surfactants, amino alkanols, and the like. It is also desirable to adjust the pH of the coating composition to a level of about 6.5-7.5. Such adjustment may be readily made by incorporating an amine in an amount of about 0.5-2 wt. %, preferably 0.5-1.5 wt. %, based on the weight of the coating composition. Examples of suitable amines include dimethylethanolamine (which is preferred), diethylaminoethanol, dibutylaminoethanol, triethylaminoethanol, and the like.

The coating compositions of the present invention possess numerous advantages over comparable solvent-based prior art coating compositions, e.g. low VOC levels, high gloss levels (>80% @60°), superior opacity and whiteness at lower film weights, faster cures to higher cure indices since the heating of the coated metal container is focused toward curing rather than evaporation (thereby resulting in shorter dwell times which in turn translate into higher speed printing runs).

A unique aspect of the coating compositions of the present invention relates to their capacity for high pigment loadings without any adverse effect on viscosity. Conventional coating compositions have pigment concentrations of 20 to 30 wt. % as compared to the present coating compositions which readily accept pigment concentrations of 30 to 60 wt. % while still maintaining the low viscosity required for many types of coating equipment, particularly gravure coaters. For example, a typical 12 oz. aluminum beverage can is usually coated with a dry film weight of 200-300 mg of a solvent-based or water/solvent-based coating. The coating compositions of the present invention exhibit not only lower VOC emissions, but also higher opacity and gloss at dry film weights in the range of 130-160 mg/12 oz. can. Such lower coating weights mean lower energy costs for drying as well as lower VOC emissions as well as higher line speeds and cleaner printing operations.

In respect to VOC emissions, the present coating compositions produce a VOC emission level of <210 g/l as determined by EPA Test Method 24. The current maximum VOC level permitted by the EPA is 263.65 g/l.

The present coating compositions invention possess higher gloss and opacity properties than conventional water-based coating compositions due to their high solids content and blend of reactive diluent and polyester polyol:

|  | Dry Film Weight | Gloss @ 60° | Opacity, % Reflectance |
| --- | --- | --- | --- |
| Present Invention | 149 mg | 85.1 | 77.74 |
| Conventional Coating | 210 mg | 72.4 | 73.21 |

The present invention will be better understood by reference to the following examples.

Polyester A was prepared by reacting 1.78 moles isophthalic acid, 0.88 mole adipic acid, 4.08 moles dipropylene glycol and 0.27 mole neopentyl alcohol in the presence of 0.2 wt. % dibutyltin dilaurate catalyst at a temperature of 180°-200° C. for two hours until an acid value of 10-15 and a hydroxyl value of 175-225 were obtained. The Brookfield viscosity of the product was 11,400 cps @25° C.

Polyester B was prepared by reacting 0.26 mole lauric acid, 0.13 mole adipic acid, 3.38 moles neopentylglycol and 1.51 moles trimellitic anhydride in the presence of 0.2 wt. % dibutyltin dilaurate catalyst at a temperature of 160°-170° C. until an initial acid value of 70 was reached. The temperature was then cooled to 120° C. and thereafter 1.42 moles of tridecyl alcohol were charged. The reaction mixture was mixed for 1 hour to obtain an acid value of 40-50 and a hydroxyl value of 160-200. The Brookfield viscosity of the product was 200,000 cps @25° C.

Polyester C was prepared by reacting 0.26 mole lauric acid, 0.13 mole adipic acid, 3.38 moles neopentylglycol and 1.51 moles trimellitic anhydride in the presence of 0.2 wt. % dibutyltin dilaurate catalyst at a temperature of 160°-170° C. until an initial acid value of 70 was reached. Thereafter, the temperature was cooled to 120° C. and 0.71 mole of tributoxyethyl phosphate were charged. The reaction mixture was mixed for 1 hour to obtain an acid value of 40-50 and a hydroxyl value of 120-150. The Brookfield viscosity of the product was 64,000 cps @25° C.

Polyester D was prepared by reacting 0.26 mole lauric acid, 0.13 mole adipic acid, 3.38 moles neopentylglycol and 1.51 moles trimellitic anhydride in the presence of 0.2 wt. % dibutyltin dilaurate catalyst at a temperature of 160°-170° C. until an initial acid value of 70 was reached. Thereafter, the reaction mixture was cooled to 120° C. and 1.38 moles of butoxytriglycol were charged. The reaction mixture was mixed for 1 hour to obtain an acid value of 40-50 and a hydroxyl value of 120-150. The Brookfield viscosity of the product was 13,000 cps @25° C.

Polyester E was prepared by reacting 34 parts of trimellitic anhydride with 48 parts of dipropylene glycol and 18 parts of tridecyl alcohol at a temperature of 180°-200° C. for 2-3 hours in the presence of 0.25 wt. % dibutyltin dilaurate catalyst and 0.003 wt. % antifoaming agent (10% silicone fluid in toluene) until an acid value of 10-20 was obtained. The Brookfield viscosity of the product was 280,000 cps @25° C. This procedure is that which is outlined in U.S. Pat. No. 5,068,273.

EXAMPLE 1

31 parts Polyester B were mixed and milled with 30 parts $TiO_2$ pigment, 13 parts hexakismethoxymethylmelamine, 2 parts N,N,N,N-tetrakis(2-hydroxyalkylethylene diamine), 1.0 part dimethylethanolamine, 7 parts tributoxyethyl phosphate and 16 parts tridecyl alcohol to produce a coating composition having a Brookfield viscosity of 1,300 cps @25° C.

EXAMPLE 2

20 parts Polyester B were mixed and milled with 40 parts $TiO_2$ pigment, 15 parts hexakismethoxymethylmelamine, 10 parts polyester polyol (100% solids, 96% minimum non-volatile, 235 hydroxyl number, less than 1 acid number and a Brookfield viscosity of 4,000 cps @25° C.), 1.0 part dimethylethanolamine, 3.0 parts sodium dioctyl sulfosuccinate and 11 parts butoxytriglycol to produce a coating composition having a Brookfield viscosity of 1,450 cps @25° C.

EXAMPLE 3

32 parts Polyester C were mixed and milled with 30 parts $TiO_2$ pigment, 13 parts hexakismethoxymethylmelamine, 1.0 part dimethylethanolamine, 3.0 parts sodium dioctyl sulfosuccinate, 8 parts tributoxyethyl phosphate to produce a coating composition having a Brookfield viscosity of 1,200 cps viscometer @25° C.

EXAMPLE 4

20 parts Polyester D were mixed and milled with 40 parts $TiO_2$ pigment, 15 parts hexakismethoxymethylmelamine, 10 parts of the polyester polyol employed in Example 2, 3.0 parts sodium dioctyl sulfosuccinate, 1.0 part dimethylethanolamine and 11 parts ethoxylated neopentylglycol to produce a coating composition having a Brookfield viscosity of 1,000 cps @25° C.

EXAMPLE 5

20 parts Polyester D were mixed and milled with 40 parts $TiO_2$ pigment, 15 parts hexakismethoxymethylmelamine, 10 parts of the polyester polyol employed in Example 2, 1.0 part dimethylethanolamine, 2.5 parts acrylated ester of phosphoric acid and 11.5 parts ethoxylated neopentylglycol to produce a coating composition having a Brookfield viscosity of 1,200 cps @25° C.

EXAMPLE 6

20 parts Polyester A were mixed and milled with 40 parts $TiO_2$ pigment, 15 parts hexakismethoxymethylmelamine, 10 parts of the polyester polyol employed in Example 2, 1.0 part dimethylethanolamine, 3 parts sodium dioctyl sulfosuccinate and 11 parts tridecyl alcohol to produce a coating composition having a Brookfield viscosity of 1,000 cps @25° C.

EXAMPLE 7

20 parts of a water-reducible polyester prepared from a polyhydroxy alcohol and a polycarboxylic acid and having an acid number of 20-60, a hydroxyl number of 100-350 and a Brookfield viscosity of 4,000-8,000 cps @25° C. were mixed and milled with 28 parts $TiO_2$, 2 parts dimethylethanolamine, 6 parts hexakismethoxymethylmelamine, 0.15 part polyether-modified dimethyl polysiloxane dispersant and 2.5 parts deionized water. The mixture was milled in a Cowles mixer to 0/0/3 grind on a Napiri gauge. Thereafter, the mixture was "letdown", i.e. diluted, with 2 parts dimethylethanolamine, 2 parts n-butanol, 6 parts of the same water-reducible polyester as used above and 31.35 parts deionized water to produce a coating composition having a Brookfield viscosity of 1,300 cps @25° C.

EXAMPLE 8

20 parts Polyester E were mixed and milled with 40 parts $TiO_2$, 15 parts hexakismethoxymethylmelamine, 10 parts of the polyester polyol employed in Example 2, 3.0 parts sodium dioctyl sulfosuccinate, 1.0 part dimethylethanolamine and 11 parts ethoxylated neopentylglycol to produce a coating composition having a Brookfield viscosity of 7,200 cps @25° C.

EXAMPLE 9

20 parts Polyester E were mixed and milled with 40 parts $TiO_2$, 15 parts hexakismethoxymethylmelamine, 3 parts sodium dioctyl sulfosuccinate, 1 part dimethylethanolamine, 10 parts of the polyester polyol of Example 8 and 11 parts tridecyl alcohol to produce a coating composition having a Brookfield viscosity of 6,500 cps @25° C.

EXAMPLE 10

20 parts Polyester E were mixed and milled with 40 parts $TiO_2$, 15 parts hexakismethoxymethylmelamine, 3 parts sodium dioctyl sulfosuccinate, 1.0 part dimethylethanolamine, 10 parts of the polyester polyol of Example 8 and 11 parts butoxy triglycol to produce a coating composition having a Brookfield viscosity of 5,600 cps @25° C.

EXAMPLE 11

22 parts Polyester D were mixed and milled with 40 parts $TiO_2$, 15 parts fully butylated glycoluril formaldehyde resin, 10 parts of a polyester polyol having a hydroxyl number of 64 and a number average molecular weight of 2640, 1 part p-toluenesulfonic acid, 1 part dimethylethanolamine and 11 parts ethoxylated neopentyl-glycol to produce a coating composition having a Brookfield viscosity of 16,700 cps @25° C.

EXAMPLE 12

22 parts Polyester D were mixed and milled with 40 parts $TiO_2$, 15 parts fully butylated glycoluril formaldehyde resin, 10 parts of a polyester polyol having a hydroxyl number of 768 and a number average molecular weight of 292, 1 part p-toluenesulfonic acid, 1 part dimethylethanolamine and 11 parts ethoxylated neopentylglycol to produce a coating composition having a Brookfield viscosity of 12,500 cps @25° C.

Table I set forth below indicates the comparison in physical properties of Examples 1-12. As may be seen from Table I, the coating composition of the present invention exemplified by Example 4 exhibited overall superior properties.

TABLE I

| Ex. | Polarity | Surface Tension, dynes/cm | Opacity %, Reflection @ 440 mm | Gloss @ 60° | Cure Index | Visc. (Brookfield cps @ 25° C.) |
|---|---|---|---|---|---|---|
| 1 | 31.60 | 28.28 | 76.70 | 75 | 380 | 1300 |
| 2 | 33.98 | 27.83 | 69.18 | 41 | 366 | 1450 |
| 3 | 35.72 | 27.03 | 73.62 | 73 | 159 | 1200 |
| 4 | 30.00 | 29.00 | 78.78 | 85 | 182 | 1000 |
| 5 | 29.78 | 30.89 | 74.07 | 76 | 271 | 1200 |
| 6 | 32.18 | 28.59 | 76.82 | 75 | 60 | 1000 |
| 7 | 26.49 | 30.99 | 67.72 | 74 | 108 | 1300 |
| 8 | 32.25 | 30.00 | 75.40 | 68 | 129 | 7200 |
| 9 | 33.50 | 27.70 | 76.20 | 70 | 135 | 6500 |
| 10 | 29.80 | 28.50 | 76.50 | 69 | 120 | 5600 |
| 11 | 28.50 | 30.70 | 74.00 | 77 | 95 | 16700 |
| 12 | 33.40 | 27.40 | 76.00 | 78 | 65 | 12500 |

What is claimed is:

1. A coating composition having a total solids content of 85 to 95 wt. %, based on the weight of the composition, a volatile organic chemical content of less than 10 wt. %, based on the weight of the composition, and a Brookfield viscosity of about 800 to 1,400 cps at 25° C., consisting essentially of:
   (a) a polyester polyol having a weight average molecular weight of about 300–900 and a hydroxy number of about 150–400;
   (b) at least one thermosettable polyester having a hydroxy value of about 40–250 and an acid value of about 30–60;
   (c) an alkoxy aminoplast resin;
   (d) 0–30 wt. %, based on the weight of the composition, of a reactive diluent; and
   (e) an acid catalyst curing agent.

2. The coating composition of claim 1 further comprising about 30–60 wt. %, based on the weight of the composition, of a pigment.

3. The coating composition of claim 1 wherein the polyester polyol is present in an amount of about 5–30 wt. %, based on the weight of the composition.

4. The coating composition of claim 1 wherein the polyester is present in an amount of about 15–40 wt. %, based on the weight of the composition.

5. The coating composition of claim 1 wherein the alkoxy aminoplast resin has a weight average molecular weight of about 200–500 and is present in an amount of about 5–30 wt. %, based on the weight of the composition.

6. The coating composition of claim 5 wherein the alkoxy aminoplast resin comprises a fully butylated glycoluril formaldehyde resin.

7. The coating composition of claim 1 wherein the reactive diluent is present in an amount of about 5–15 wt. %, based on the weight of the composition.

8. The coating composition of claim 1 wherein the reactive diluent comprises a $C_2$–$C_{12}$ glycol, glycol ether, ethoxylated glycol or alcohol.

9. The coating composition of claim 8 wherein the reactive diluent comprises ethoxylated neopentylglycol.

10. The coating composition of claim 1 wherein the acid catalyst curing agent comprises a sulfonic acid, phosphonic acid or phosphoric acid.

11. The coating composition of claim 1 wherein the acid catalyst curing agent comprises p-toluene sulfonic acid.

12. The coating composition of claim 1 further comprising an adhesion promoter present in an amount of up to about 10 wt. %, based on the weight of the coating composition.

13. The coating composition of claim 1 further comprising a wetting agent present in an amount of up to about 2 wt. %, based on the weight of the coating composition.

14. The coating composition of claim 1 further comprising an amine present in an amount sufficient to adjust the pH of the composition to a level of about 6.5 to 7.5.

* * * * *